United States Patent
Fein

Patent Number: 5,884,007
Date of Patent: Mar. 16, 1999

[54] VEHICULAR CONVECTION HEATER

[76] Inventor: Len Fein, 611-7th St., Baraboo, Wis. 53913

[21] Appl. No.: 26,146

[22] Filed: Feb. 19, 1998

[51] Int. Cl.⁶ .................................. B60L 1/02; H05B 1/02
[52] U.S. Cl. ........................... 392/367; 219/202; 219/203
[58] Field of Search ..................................... 392/367, 379, 392/382, 383, 350, 360, 365, 366; 219/202, 203, 209; 237/5, 28; 454/93, 121, 126, 127

[56] References Cited

U.S. PATENT DOCUMENTS

| | | | |
|---|---|---|---|
| 1,528,300 | 3/1925 | W. J. Noonan | 392/361 |
| 3,264,450 | 8/1966 | B. Wallace | 392/307 |
| 3,440,398 | 4/1969 | O. K. Nilssen | 392/307 |
| 4,454,984 | 6/1984 | Shaltis | 237/2 A |
| 5,187,349 | 2/1993 | Curhan et al. | 219/202 |
| 5,279,459 | 1/1994 | Single, II | 237/2 A |
| 5,399,838 | 3/1995 | Brown | 219/202 |
| 5,408,071 | 4/1995 | Rangland et al. | 219/530 |
| 5,667,710 | 9/1997 | Krtaemer | 219/202 |
| 5,732,764 | 3/1998 | Douglas et al. | 165/41 |
| 5,749,516 | 5/1998 | Humburg | 237/2 A |

*Primary Examiner*—Teresa Walberg
*Assistant Examiner*—Vinod D. Patel

[57] ABSTRACT

A vehicular heater is provided including a box mounted within a vehicle. Also included is a heater assembly situated within the box and adapted to generate heat upon the receipt of power. A plurality of exhaust fans are each rotatably mounted to the box for creating a flow of air past the heater assembly and directed toward the engine of the vehicle and further in communication with the vehicle cab heater duct system of the vehicle. Next provided is a control panel for selectively supplying the exhaust fans and heater assembly with power.

1 Claim, 2 Drawing Sheets

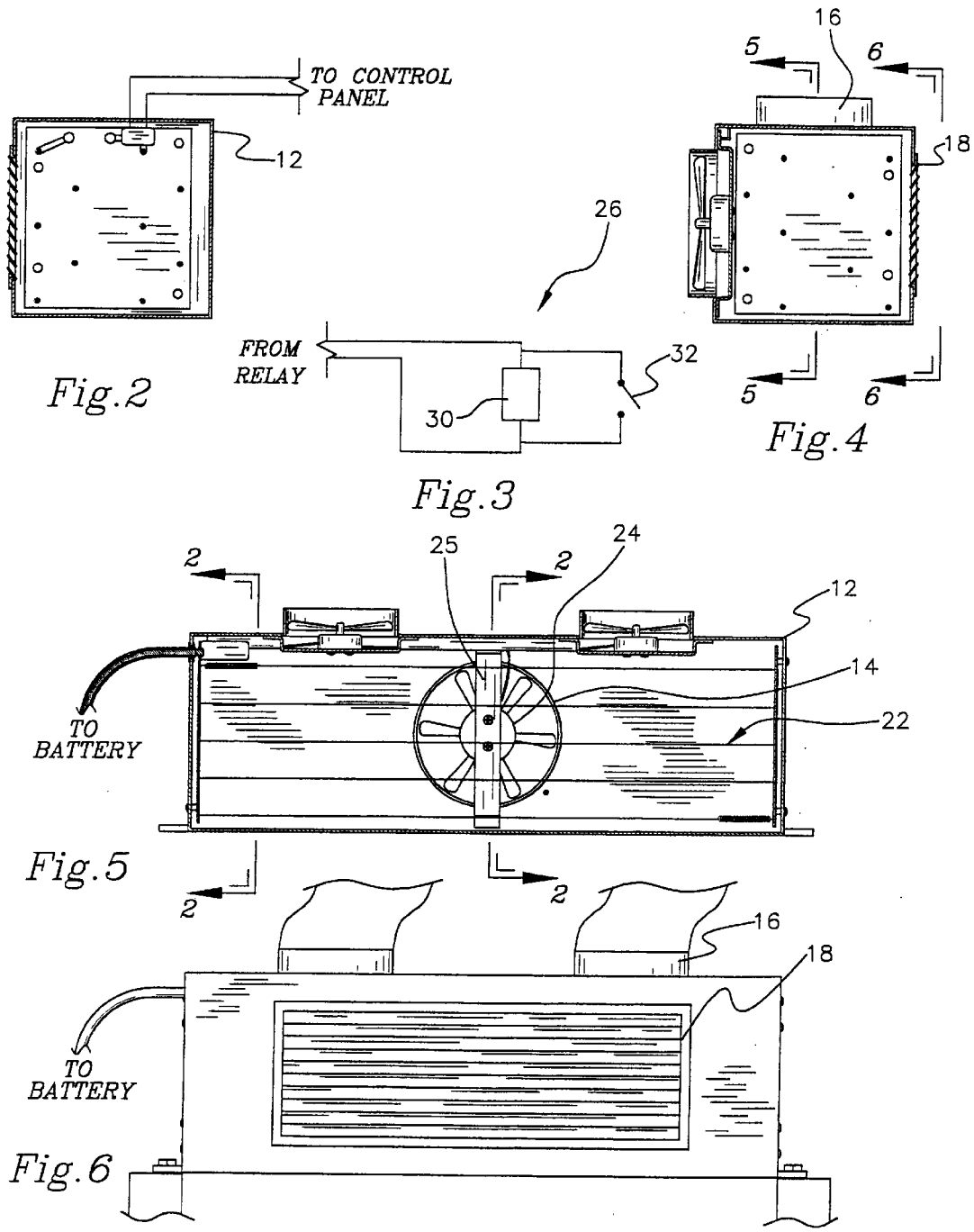

VEHICULAR CONVECTION HEATER

BACKGROUND OF THE INVENTION

1. Field of the Invention

The present invention relates to vehicle heaters and more particularly pertains to a new vehicular convection heater for heating a vehicle cab and engine by way of the flow of heated air.

2. Description of the Prior Art

The use of vehicle heaters is known in the prior art. More specifically, vehicle heaters heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle heaters include U.S. Pat. No. 5,399,838; U.S. Pat. No. 5,206,476; U.S. Pat. Des. 287,751; U.S. Pat. No. 4,636,615; U.S. Pat. No. 5,352,862; and U.S. Pat. No. 5,408,071.

In these respects, the vehicular convection heater according to the present invention substantially departs from the conventional concepts and designs of the prior art, and in so doing provides an apparatus primarily developed for the purpose of heating a vehicle cab and engine by way of the flow of heated air.

SUMMARY OF THE INVENTION

In view of the foregoing disadvantages inherent in the known types of vehicle heaters now present in the prior art, the present invention provides a new vehicular convection heater construction wherein the same can be utilized for heating a vehicle cab and engine by way of the flow of heated air.

The general purpose of the present invention, which will be described subsequently in greater detail, is to provide a new vehicular convection heater apparatus and method which has many of the advantages of the vehicle heaters mentioned heretofore and many novel features that result in a new vehicular convection heater which is not anticipated, rendered obvious, suggested, or even implied by any of the prior art vehicle heaters, either alone or in any combination thereof.

To attain this, the present invention generally comprises a box having a rectangular configuration. As shown in the Figures, the box is defined by a top face, a bottom face, a pair of side faces and a pair of end faces interconnected thus forming an interior space. The top face has a pair of circular cut outs formed therein in side-by-side relationship, as shown in FIG. 1. A first side face of the box has a circular cut out formed in a central extent thereof. Each of the circular cut outs has a cylindrical flange mounted thereabout and extended outwardly therefrom. A second side face has a vent opening formed therein. As shown in FIGS. 2 & 4, the vent opening is equipped with a plurality of vanes mounted thereon. The end faces of the box each have a pair of C-shaped mounting feet integrally coupled thereto and extending therefrom. In use, the mounting feet are mounted within an engine compartment. Further, the flanges of the cut outs of the top face are connected to a vehicle cab heater duct system. The flange of the cut out of the first side face is directed toward the engine of the vehicle for reasons that will soon become apparent. Next provided is a heater assembly including a plurality of linear filaments. Each of the filaments has a pair of ends coupled within the box between the end faces thereof adjacent to the vent opening. In operation, the filaments are adapted to generate heat upon the receipt of power. Associated therewith is a plurality of exhaust fans each rotatably mounted within an associated one of the circular cut outs of the box. Each of the exhaust fans serve for creating a flow of air through the vent opening, past the filaments and out the cut outs only upon the receipt of power. Situated within the cab of the vehicle is a control panel connected between the heater assembly and exhaust fans and a battery. The control panel includes a timer adapted to supply the heater assembly and exhaust fans with power during predetermined time periods. Preferably, such time periods occur at selected times and for selected durations. As shown in FIG. 3, a manual switch is included for supplying the heater assembly and exhaust fans with power unconditionally upon the closing thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular convection heater apparatus and method which has many of the advantages of the vehicle heaters mentioned heretofore and many novel features that result in a new vehicular convection heater which is not anticipated, rendered obvious, suggested, or even implied by any of the prior art vehicle heaters, either alone or in any combination thereof.

It is another object of the present invention to provide a new vehicular convection heater which may be easily and efficiently manufactured and marketed.

It is a further object of the present invention to provide a new vehicular convection heater which is of a durable and reliable construction.

An even further object of the present invention is to provide a new vehicular convection heater which is susceptible of a low cost of manufacture with regard to both materials and labor, and which accordingly is then susceptible of low prices of sale to the consuming public, thereby making such vehicular convection heater economically available to the buying public.

Still yet another object of the present invention is to provide a new vehicular convection heater which provides in the apparatuses and methods of the prior art some of the advantages thereof, while simultaneously overcoming some of the disadvantages normally associated therewith.

Still another object of the present invention is to provide a new vehicular convection heater for heating a vehicle cab and engine by way of the flow of heated air.

Even still another object of the present invention is to provide a new vehicular convection heater that includes a box mounted within a vehicle. Also included is a heater assembly situated within the box and adapted to generate heat upon the receipt of power. A plurality of exhaust fans are each rotatably mounted to the box for creating a flow of air past the heater assembly and directed toward the engine of the vehicle and further in communication with the vehicle cab heater duct system of the vehicle. Next provided is a control panel for selectively supplying the exhaust fans and heater assembly with power.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention.

FIG. 3 is a schematic diagram of the present invention.

FIG. 4 is another side view of the present invention.

FIG. 5 is a cross-sectional view of the present invention taken along line 5—5 shown in FIG. 4.

FIG. 6 is a rear view of the present invention showing the vent opening.

DESCRIPTION OF THE PREFERRED EMBODIMENT

Figure 1:
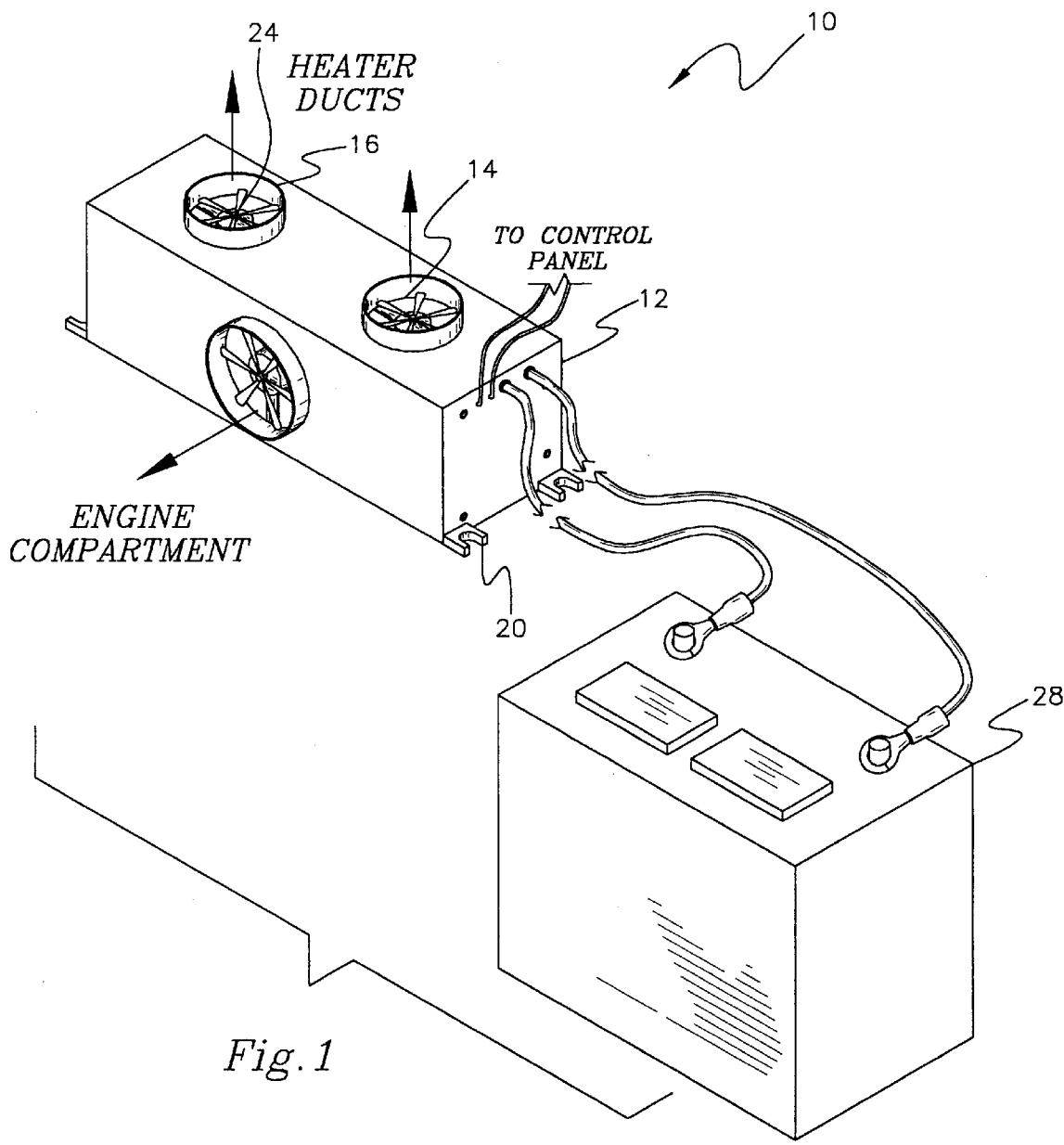
FIG. 1 is a perspective view of a new vehicular convection heater according to the present invention.

With reference now to the drawings, and in particular to FIGS. 1 through 6 thereof, a new vehicular convection heater embodying the principles and concepts of the present invention and generally designated by the reference numeral 10 will be described.

The present invention, designated as numeral 10, includes a box 12 having a rectangular configuration. As shown in the Figures, the box is defined by a top face, a bottom face, a pair of side faces and a pair of end faces interconnected thus forming an interior space. The top face has a pair of circular cut outs 14 formed therein in side-by-side relationship, as shown in FIG. 1. A first side face of the box has a circular cut out formed in a central extent thereof. Each of the circular cut outs has a cylindrical flange 16 mounted thereabout and extended outwardly therefrom. A second side face has a vent opening 18 formed therein. As shown in FIGS. 2 & 4, the vent opening is equipped with a plurality of vanes mounted thereon.

The end faces of the box each have a pair of C-shaped mounting feet 20 integrally coupled thereto and extending therefrom. The mounting feet reside in coplanar relationship with the bottom face and adjacent to opposed side faces of the box. In use, the mounting feet are mounted within an engine compartment. Further, the flanges of the cut outs of the top face are connected to a vehicle cab heater duct system. This preferably accomplished by way of flexible tubes which each have a first end coupled about the associated flange. Second ends of the tubes are connected to separate vents of the vehicle cab heater duct system. Such vents include the windshield vent and the dashboard mounted vents. Ideally, the connection with such vents is effected downstream of any valves associated with the vehicle cab heater duct system. Also during use, the flange of the cut out of the first side face is directed toward the engine of the vehicle for reasons that will soon become apparent.

Next provided is a heater assembly 22 including a plurality of linear filaments. Each of the filaments has a pair of ends coupled within the box between the end faces thereof and adjacent to the vent opening. As such a plurality of horizontally oriented parallel filaments are provided. In operation, the filaments are adapted to generate heat upon the receipt of power.

Associated therewith is a plurality of exhaust fans 24 each rotatably mounted within an associated one of the circular cut outs of the box. Such mounting is accomplish with cross bars 25 shown in FIG. 5. Each of the exhaust fans serve for creating a flow of air through the vent opening, past the filaments and out the cut outs only upon the receipt of power.

Situated within the cab of the vehicle is a control panel 26 connected between the heater assembly, exhaust fans and a battery 28. The battery preferably comprises one which is separate from the conventional vehicle battery. The control panel includes a timer 30 adapted to supply the heater assembly and exhaust fans with power during predetermined time periods. Preferably, such time periods occur at selected times and for selected durations. This may be accomplished via dials, electronics or the like. As shown in FIG. 3, a manual switch 32 is included for supplying the heater assembly and exhaust fans with power unconditionally upon the closing thereof.

In use, the present invention ensures that the vehicle cab is heated, windshield defrosted and the engine warmed at the discretion of the user. By use of convection air heating in the engine compartment, belts and other components of the vehicle are heated and dried prior to use thereby improving their longevity.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular heater comprising, in combination:

a box having a rectangular configuration with a top face, a bottom face, a pair of side faces and a pair of end faces interconnected thus defining an interior space, the top face having a pair of circular cut outs formed therein in side-by-side relationship, a first side face having a circular cut out formed in a central extent thereof, each of the circular cut outs having a cylindrical flange mounted thereabout and extending outwardly therefrom, a second side face having a vent opening formed therein with a plurality of vanes mounted thereon, the end faces each having a pair of C-shaped mounting feet integrally coupled thereto and extending therefrom in coplanar relationship with the bottom face adjacent to opposed side faces, wherein the mounting feet are mounted within an engine compartment with the flanges of the cut outs of the top face being connected to a vehicle cab heater duct system via flexible tubes and the flange of the cut out of the first side face is directed toward the engine of the vehicle, wherein a pair of the tubes are each connected between the flanges of one of the cut outs of the top face and at least one of a windshield vent and a dashboard vent of the vehicle cab heater duct system wherein one of the tubes is connected to the flange of the cut out of the first side face of the housing and is directed toward an engine of the vehicle;

a heater assembly including a plurality of parallel linear filaments each having a pair of ends coupled within the box between the end faces thereof adjacent to the vent opening, the filaments adapted to generate heat upon the receipt of power;

a plurality of exhaust fans each rotatably mounted on cross bars within an associated one of the circular cut outs of the box for creating a flow of air through the vent opening, past the filaments and out the cut outs only upon the receipt of power; and a control panel situated within the cab of the vehicle and connected between the heater assembly and exhaust fans and a battery, the control panel including a timer adapted to supply the heater assembly and exhaust fans with power during predetermined time periods at selected times and durations and a manual switch for supplying the heater assembly and exhaust fans with power unconditionally upon the closing thereof.

* * * * *